No. 724,197. PATENTED MAR. 31, 1903.
S. G. MARSHUTZ.
TRIAL FRAME FOR OCULISTS OR OPTICIANS.
APPLICATION FILED AUG. 17, 1900.
NO MODEL. 5 SHEETS—SHEET 4.
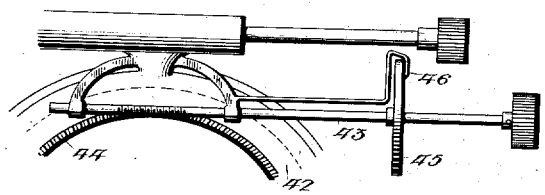
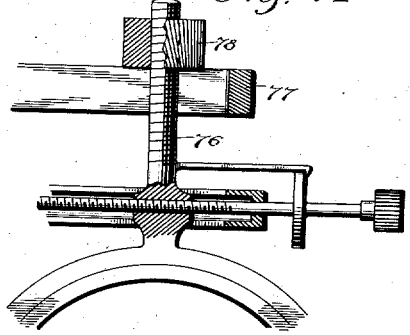
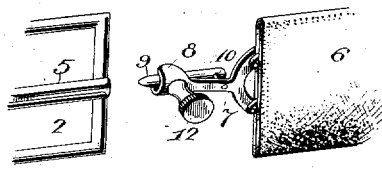
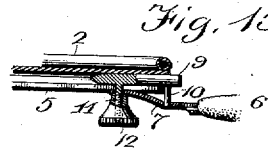
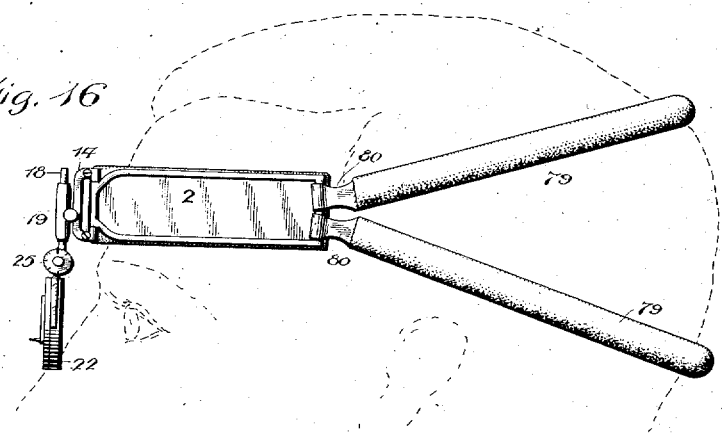
Witnesses:
D. C. Jenkins
J. B. Malnato
Inventor:
Siegfried G. Marshutz
by Dodge and Sons
Attorneys.

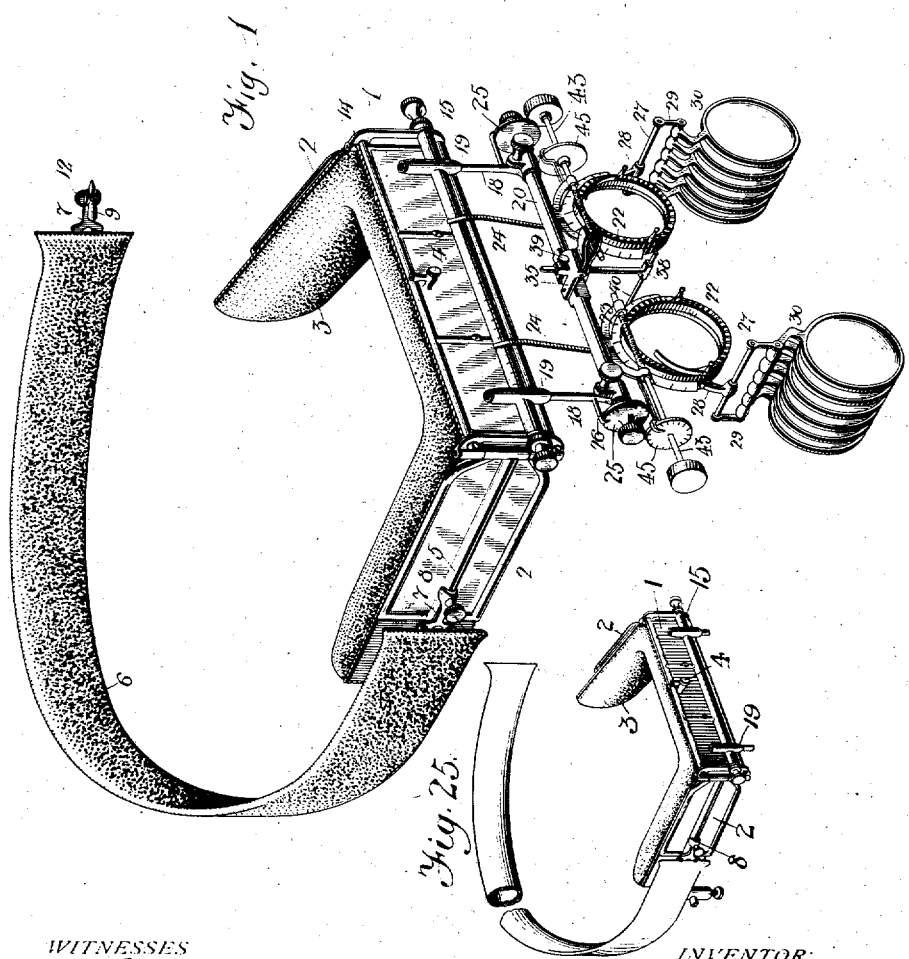

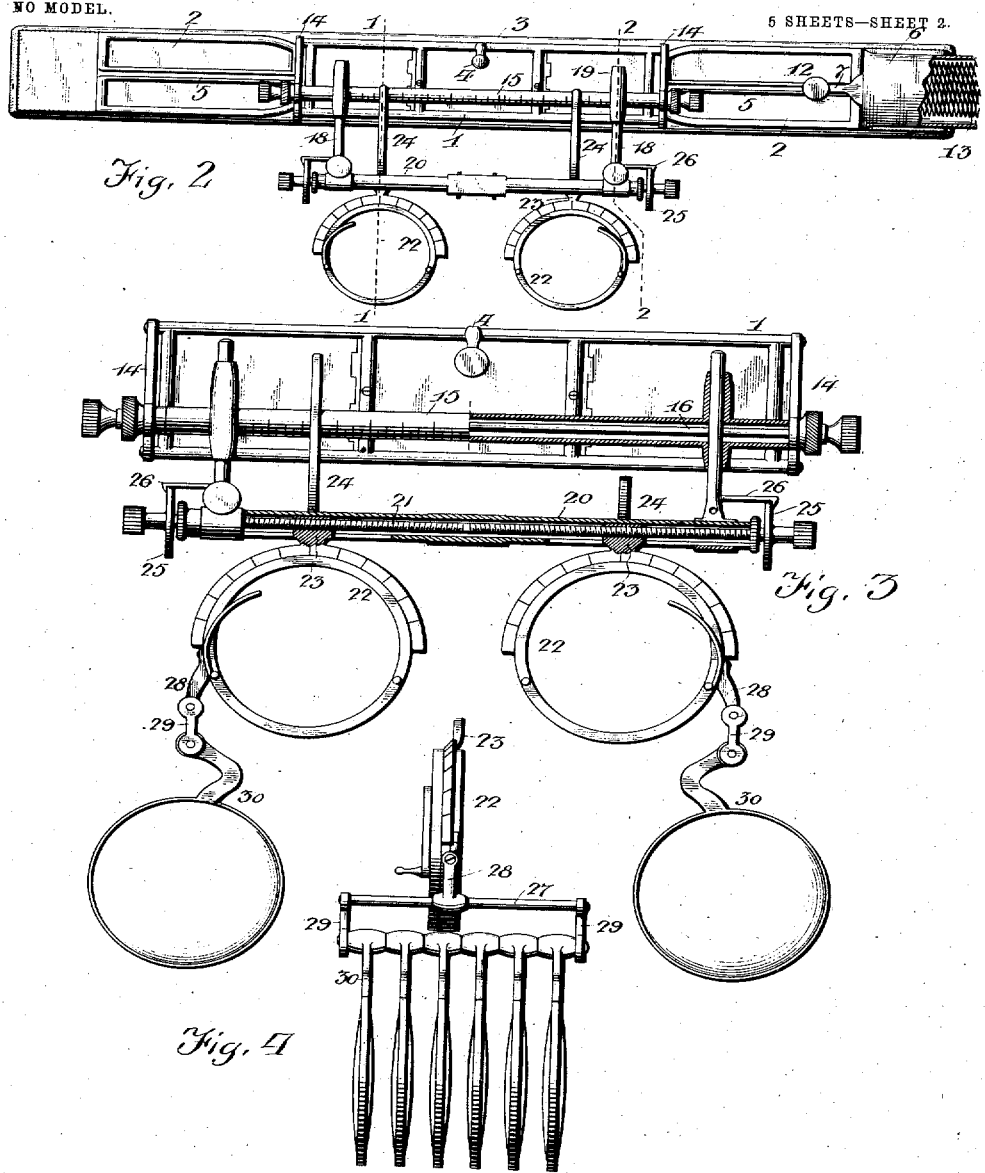

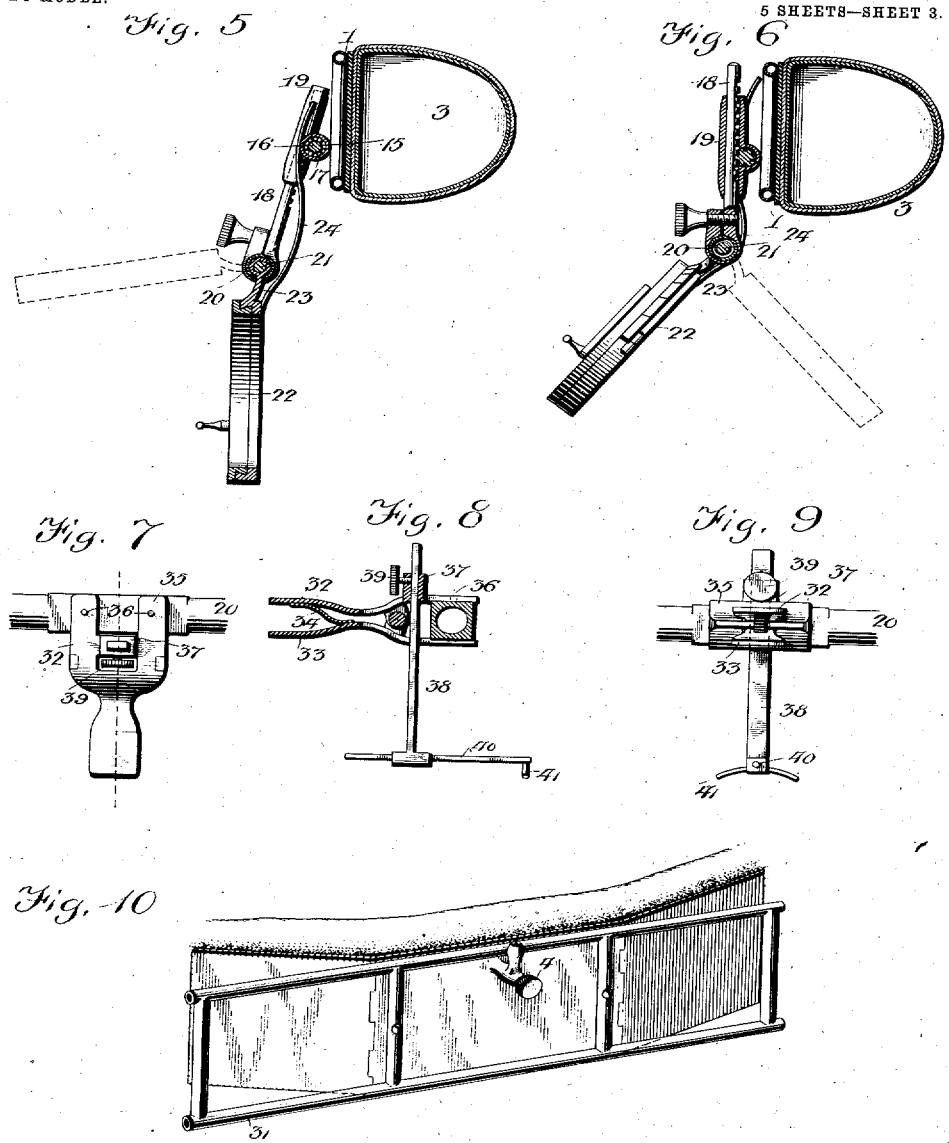

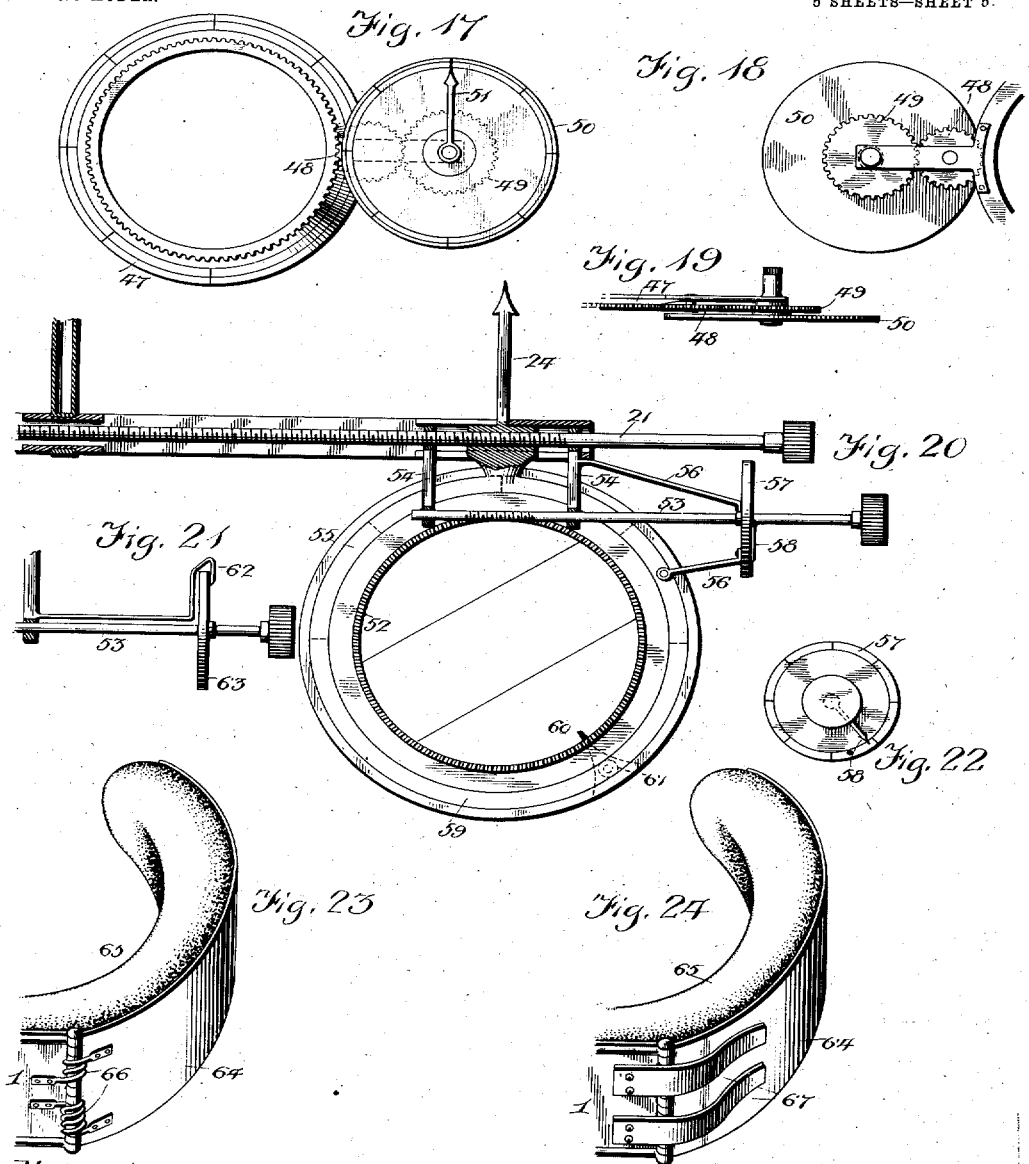

UNITED STATES PATENT OFFICE.

SIEGFRIED G. MARSHUTZ, OF LOS ANGELES, CALIFORNIA.

TRIAL-FRAME FOR OCULISTS OR OPTICIANS.

SPECIFICATION forming part of Letters Patent No. 724,197, dated March 31, 1903.

Application filed August 17, 1900. Serial No. 27,195. (No model.)

*To all whom it may concern:*

Be it known that I, SIEGFRIED G. MARSHUTZ, a citizen of the United States, residing at Los Angeles, in the county of Los Angeles and State of California, have invented certain new and useful Improvements in Trial-Frames for Oculists or Opticians, of which the following is a specification.

My present invention pertains to improvements in trial-frames for oculists and opticians, the construction and advantages of which will be hereinafter set forth, reference being had to the annexed drawings, wherein—

Figure 1 is a perspective view of the frame as a whole, certain attachments being omitted; Fig. 2, a front elevation; Fig. 3, a similar view, on an enlarged scale, showing the attachment of a frame carrying a series of trial-lenses; Fig. 4, a side elevation of the trial-lens frame or carrier; Fig. 5, a cross-sectional view on the line 1 1 of Fig. 2; Fig. 6, a similar view on the line 2 2; Figs. 7, 8, and 9, front, sectional, and rear views, respectively, of the nose adjusting-piece; Fig. 10, a perspective view of a modified construction of the main frame or holder; Fig. 11, a rear elevation of a portion of the device, showing the means for rotating the lens-holding cell; Fig. 12, a similar view, partly in section, illustrative of a modified means which may be employed for securing the vertical adjustment of the cells; Fig. 13, a side elevation of one of the cells, showing the beveled scale; Fig. 14, a perspective view of the clamping device employed in connection with the construction shown in Figs. 1 and 2; Fig. 15, a sectional view of the same; Fig. 16, a side elevation showing the trial-frame in working position and also illustrating a modified form of attaching means; Figs. 17, 18, and 19, detail views of the cell-indicating devices; Fig. 20, a rear elevation showing a modified form of the cell indicating and moving devices; Fig. 21, a similar view; Fig. 22, a face view of the dial shown in Fig. 20; Figs. 23 and 24, perspective views showing modified forms of means for holding the frame in position; and Fig. 25, a perspective view showing a portion of the frame as illustrated in Fig. 1, with a pneumatic band for securing the same to the head of the patient.

The main objects of my invention are to secure a universal adjustment of the lens-holding cells, to provide means for securing such adjustment, to provide means whereby the angular adjustment of the lenses carried by the cells may be readily ascertained by the operator, to provide auxiliary lens-carrying frames which may be readily brought into operative relation or position with the lens or lenses in the cells, to provide mean whereby the pupilary adjustment of the lens holders or cells may be readily ascertained by the operator without being compelled to look into the patient's face, to provide means whereby the principal operations for adjusting a trial-frame on the head of a patient may be accomplished from the side of the trial-frame, and thus to one side of the patient's head, without the operator being compelled to place his hands before the patient's face, and also other objects and advantages which will appear in the following description.

Referring more particularly to Figs. 1 to 9, inclusive, and 14 and 15, 1 indicates the main supporting-bar, having hinged to its ends side bars or members 2, said members 1 and 2 having secured to their inner or rear faces a rubber or other hollow yielding body or tube 3, which may be inflated through a suitable valve or cock 4. The side members 2 have secured to them a tubular slotted member 5, adapted and designed to receive attaching devices for a band or yielding strap 6, said attaching devices being shown in detail in Figs. 14 and 15. To each end of the strap there is secured an arm 7, having downwardly-projecting wings 8. A shoe-piece 9 of such diameter as to pass within the slotted tubular member 5 is made fast to arm 7 by a stud or post 10, and rising from said shoe near its outer end or in line with the winged portion 8 is a threaded stem 11, which passes freely through an opening formed in arm 7. A thumb-nut 12 is mounted upon the outer end of stem 11, and after the shoe is entered in the tubular slotted member 5 and the parts brought to their adjusted position thumb-nut 12 is screwed upon the threaded stem, causing shoe 9 to bear against the face of tubular member 5 and U-shaped or winged portion of arm 7 to bear or clamp upon the outer face of the tubular member. This construction forms a ready means for attaching the flexible band or strap 6 to the side members 2, as well as permitting a ready adjustment of the parts. The strap 6 will preferably be formed of a series of light coiled springs 13, Fig. 2, covered by a fabric. Such a construction permits a slight longitudinal stretch of the strap, and it is manifest that when it acts in conjunction with the pneumatic cushion formed upon the members 1 and 2 a comfortable and ready fit of the frame upon the head of the wearer is insured, as well as a firm retention thereof in place. Instead of employing a strap formed in this manner a pneumatic band or tube may be used, as illustrated in Fig. 25. This band may or may not be adjustable. The fact that it is distended renders adjustment to a greater or less extent unnecessary. With any of the constructions it is advisable to so make the band that its outer covering will be in the nature of a flexible tube—as, for instance, of velvet. This for the reason that the springs or other appliances which hold the trial-frame to the head will catch in the patient's hair. Either construction affords a comfortable method of retaining the frame firmly on the head of the patient without the possibility of the fastening devices catching in the hair.

To the front plate or member 1 or upon suitable brackets 14 extending upwardly in front thereof there is pivotally secured a tube 15, in which is mounted a rod 16, Figs. 3 and 5, having formed thereon pinions 17, which mesh with racks 18, working in guides or ways 19, secured or mounted upon tubular member 15. Said racks 18 constitute a support for a tubular member 20, journaled in the lower ends thereof and in which is mounted a threaded shaft 21, the threads of which, as is usual, being right and left upon opposite sides of the center.

Cells or lens-holders 22, of any usual construction, are employed in the construction shown in Figs. 1, 2, 3, 5, and 6, though in practice there will be used, in all probability, a lens holder or cell of a novel construction, as hereinafter set forth. It is to be understood, however, that either form of lens-holder may be employed. The threaded nuts or blocks 23, formed at the upper ends thereof, work through slots formed in the tubular member 20 and are engaged and actuated by shaft 21. Spring-arms 24 are secured at their lower ends to the cells or to the tubular member 20 and serve as index-fingers or pointers, working over a scale formed upon member 15 in order that the pupilary adjustment of the cells may be readily seen and determined. To effect this same end—namely, the ready determination of the pupilary adjustment—there may also be employed a scale or dial 25, (see Figs. 1, 2, and 3,) carried at the outer ends of the shaft 21, which works in conjunction with fixed pointer or index-finger 26, (Shown as attached to one of the rack members 18.) This construction is advantageous from many points of view, as the operator can readily determine the pupilary adjustment without having to look around in front or into the face of the person undergoing treatment.

From the description thus far given it will be seen that the cells 22 may be adjusted in a horizontal plane for pupilary adjustment, may be raised or lowered in a vertical line by the movement of shaft 16, and may also be swung to either side of the vertical position by reason of the tubular member 20 being journaled in the lower ends of the rack members 18. Some of the various positions which the cells may assume are indicated in Figs. 5 and 6. In Fig. 5 the members 18 are shown in a lowered position, with the cell in a practically vertical position in full lines and swung up out of the way, as shown in dotted lines. In Fig. 6 the cells are shown in an elevated position with reference to the main frame of the device, and thrown forward in full lines and rearwardly in dotted lines, the two positions being, however, somewhat extreme in order to accentuate the possibilities of adjustment of the apparatus.

In Figs. 1, 3, and 4 there is illustrated a construction which I term an "auxiliary-lens" attachment. It consists of a bar 27, slidably mounted in a bracket 28, which is secured to the fixed member of the usual lens cell or holder. From said bar 27, at each end thereof, depend arms 29, and between said arms is secured a rod upon which are pivotally mounted a series of lens-holders 30, containing suitable lenses of different strength. The connecting-arms of the frames 30 are preferably crooked, as shown, in order that the lenses may be thrown up in line with the lenses carried by the usual cell 22 without having anything projecting across the lenses carried by the cell. It will be noted that the bar or rod 27 may be moved longitudinally through the bracket 28 and that any one of the series of lenses carried by the frames 30 may be brought up in direct and close alinement with the lens or lenses carried by cells 22. Ordinarily the auxiliary lenses will depend or hang down in the position indicated in Figs. 1 and 3, where they will be out of the way of the attendant or operator and will not hinder or obstruct the view of the patient in the least. By detaching the bracket 28 the auxiliary lenses and their carriers may be readily dispensed with and the frame as a whole lightened to that extent.

In Fig. 10 it will be seen that the front plate or member is not as long as shown in Figs. 1 and 2 and that the tubular supports 31 afford the length necessary to secure a proper relation between the parts.

In Figs. 1, 7, 8, and 9 there is shown a detachable nose-piece, which may or may not be used, as desired. When employed, it will be used simply to secure the proper measurement for the nose-piece required for the spectacle-frame and not to obtain proper adjustment of the frame upon the patient's head, as in the case of the trial-frames heretofore constructed. Upon reference more particularly to Figs. 7, 8, and 9 it will be seen that it comprises two arms 32 and 33, hinged together, the outer ends of which are held or forced apart by a spring member 34. The inner members or fingers 35 are provided with suitable holes adapted to pass over pins 36 when the nose-piece is clamped upon the cross-bar or tubular member 20. The upper member 32 is provided with a hollow stud 37, through which passes a post 38, adjustably held therein by a set-screw 39. The lower end of the post is enlarged and provided with a horizontally-disposed opening, through which passes an arm 40, carrying at its outer end a curved member 41, adapted to rest upon the nose of the patient when the parts are adjusted to their proper position. This detachable nose-piece constitutes one of the features of my present invention. As now constructed trial-frames are usually held in place by the nose-piece only and the total weight of the heavy front part of the old-style frame rests on the patient's nose. The detachable nose-piece in the present structure will only be used to measure the height of the nose for the purpose of making the final fit of the spectacles or glasses to be worn; but during the whole operation of testing the patient's vision the nose-piece is not present, and consequently will not oppress the patient's nose, nor will it involve the carrying of the weight of the trial-frame on the nose, since the frame is held upon the head by the means heretofore described.

In Fig. 11 there is shown a construction wherein the movable member 42 of the cell or lens-holder may be actuated by a worm-shaft 43, acting in conjunction with a circular rack 44, formed upon the periphery of the said member 42. There is also secured upon the worm-shaft 43 a graduated dial or disk 45, which acts, in conjunction with a fixed pointer 46, to indicate the degree of rotation of the movable member 42, so that the degree of movement of said movable member and the lens carried thereby may be readily and speedily determined, and this without the necessity of the operator facing the patient. It will also be noted upon reference to Fig. 13 that the face of the rotating member is beveled and a scale formed thereon, as at 47. This beveled scale facilitates the determination of the position of the movable member of the lens holder or cell and may be used in conjunction with or independent of the dial or index 45, just referred to.

In Figs. 17, 18, and 19 another form of indicator for the cell or lens position is shown. It will be noted upon reference to said views that the movable member of the cell is provided with a circular rack, which in turn meshes with a pinion 48, said pinion meshing with a gear 49, made fast to and movable with an index plate or dial 50. A fixed pointer 51 shows the adjusted position of the parts as the cell-frames are rotated.

In Fig. 20 there is shown a device wherein the ordinary adjustment of the lens carried by the cell may be indicated upon a dial or scale carried to one side of the cell proper; also, a separate indicator or pointer to show the position of the lens last removed from the cell, so that the operator may place the succeeding lens in the exact position occupied by the one just taken out. Furthermore, it shows an indicator or pointer so arranged that the pupilary adjustment of the cells will be indicated upon a suitable scale upon the frame. Referring more particularly to said Fig. 20, 52 indicates the inner movable member of the cell or lens-holder adapted to be actuated by a worm-shaft 53, which shaft is carried by depending bars 54. Shaft 21, as in the construction above referred to, is provided for moving the cells either to the right or left to secure the necessary pupilary adjustment. The fixed member of the cell or lens-holder is designated by 55 and to it and one of the depending arms 54 are secured arms 56, which form suitable supports for disk or dial plate 57, over which works a pointer 58, attached directly to the operating or worm shaft 53. Surrounding and moveable upon the fixed member 55 of the cell or lens-holder is a ring 59, provided with a pointer 60, which has a set-screw working therein. The pointer 60 is adapted to pass over the scale upon the fixed member 55, and a set-screw 61, mounted in said pointer, enables the operator to fasten said ring 59 at any desired point to indicate the position of the lens which has just been removed, so that the lens to take its place may be put in the position occupied by the previous one.

In Fig. 21 an alternative construction is shown, wherein it will be noted that the fixed pointer (indicated by 62 works) in conjunction with a disk or index 63, secured upon the operating-shaft 53.

In Figs. 23 and 24 there is illustrated a modified form of the main frame, wherein instead of employing a strap to pass about the head, as in the former construction, the front plate 1 has hinged to it at each end curved arms 64, adapted to conform in outline to the head of the person. A pneumatic cushion 65 is preferably employed. To maintain the parts in position, springs 66, coiled about the hinge, as shown in Fig. 23, may be employed, or flat springs 67, as shown in Fig. 24, may be used.

In Fig. 12 there is shown a form of suspending device for the cell, wherein instead of employing racks for elevating the cell a threaded stem or post 76 extends up from the cell through a slotted bar 77. A thumb-nut 78, screwed upon the upper end of the post, provides for the vertical adjustment of the cell and at the same time permits its longitudinal or pupilary adjustment toward the companion cell.

In Fig. 16 I have shown a modified form of holding device for the frame. Instead of employing the slotted tubular members 5, as in the construction illustrated in Figs. 1, 2, and 14, two straps or bands 79, preferably of the same construction as band 6, are detachably connected to the side members 2 by hooks or other suitable fastening devices 80. From the drawings it will be seen that the two bands insure a firm holding of the frame upon the head of the patient.

From the foregoing description it will be noted that the invention is susceptible of many modifications, and I do not, therefore, desire to limit myself in the broad and underlying principles to any particular formation or construction.

As before mentioned, the adjustment of the cells or lens-holders is universal—that is to say, they may be adjusted in a horizontal plane toward and from each other, may be moved in a vertical plane, and they may also be swung backward and forward. This latter movement—namely, swinging them forward—is of manifest advantage when it is desired to remove the testing-lenses out of the line of vision of the patient for any reason, and this without the necessity of removing the testing-frame or taking the lenses from the cells. Again, as pointed out, by having the index or scale for reading the pupilary adjustment arranged to one side of the cells and at right angles thereto—as, for instance, the dials or index-plates 25, 57, and 63—the pupilary adjustment may be determined with facility and without the necessity of the operator standing in front or looking directly in the face of the patient. The pointer formed by spring-arms 24 working in conjunction with the index on the face of the main frame or cross-bar also affords another ready means of reading the pupilary adjustment, and the use of the beveled scale, as shown most clearly in Fig. 13, is also advantageous in reading the correct position of the lenses within the cells. The employment of the scale or index to one side of the frame for indicating the position of the lens or cell is of great advantage, thus doing away with the necessity of constantly looking into the patient's face while the examination is in progress.

The use of the supplemental lens-holder in conjunction with the ordinary cells is advantageous for the reasons given, and while the construction set forth is deemed the best in practice yet it is manifest that now that the idea has been suggested various means may be employed for bringing about the same end.

Having thus described my invention, what I claim is—

1. In a trial-frame, the combination of a suitable support; a pair of lens cells or holders carried thereby, said cells or holders being bodily adjustable toward and from each other, movable up and down toward and from said support in a plane at right angles to the axes of the lens-holders, and also bodily movable to each side of their normal vertical position toward and from the face of the patient.

2. In combination with a suitable support, a pair of lens cells or holders depending therefrom; means for adjusting said holders toward and from each other; means for raising and lowering said cells in a vertical plane; and connections intermediate the cells and the other portions of the device, whereby said cells may be swung backward and forward from a vertical position.

3. In a trial-frame, the combination of a suitable support; a pair of lens cells or holders pivotally suspended therefrom; and means for raising and lowering said cells, whereby they may be swung up bodily into a horizontal plane and may likewise be adjusted vertically, substantially as described.

4. In a trial-frame, the combination of a suitable support; a bar or tube journaled thereon; adjustable supports extending downwardly from said bar or tube; a second bar or tube journaled in the lower ends of said supports; a pair of lens-holders carried by said second bar or tube; and means for adjusting said lens holders or cells toward and from each other.

5. In a trial-frame, the combination of a suitable support; a bar or tube journaled thereon; suitable supports extending downwardly from said bar or tube; means for raising and lowering said supports; a second bar or tube journaled in the lower ends of said supports; a pair of cells or lens-holders; and a screw-threaded shaft extending through said tube or bar, adapted and arranged to move the cells toward and from each other.

6. In a trial-frame, the combination of a suitable support; a bar or tube journaled thereon; suitable supports depending from said bar; means for raising and lowering said supports; a tube journaled in the lower end of said supports; a pair of cells or lens-holders carried by said tube; and means for adjusting the position of said cells.

7. In a trial-frame, the combination of a suitable support; a pair of lens cells or holders connected thereto and movable toward and from each other, toward and from said support, and also bodily movable to one or the other side of their normal vertical position toward or from the face of the patient; means for maintaining said holders in a normal vertical position; and an index to indicate the pupilary adjustment of said cells, said index being located to one side of the frame.

8. In a trial-frame, the combination of a suitable support; a pair of lens holders or cells connected thereto and movable toward and from each other, toward and from said support, and also bodily movable to one or the other side of their normal vertical position toward or from the face of the patient; spring-arms extending upwardly from said cells and contacting with a portion of the supporting member; a scale formed on said supporting member over which the springs will pass as the lens holders or cells are adjusted for pupilary distance; and means for adjusting the lens-holders toward and from each other.

9. In a trial-frame, the combination of a suitable support adapted to be secured to the head of a person; a pair of cells or lens-holders suspended therefrom; and an auxiliary lens-holding frame pivotally suspended from each of said cells or holders and normally occupying a position to one side of the same and out of line therewith and adapted to be swung up in front of the main lens-holder to be used in conjunction therewith.

10. In a trial-frame, the combination of a suitable support; a pair of cells or lens-holders suspended therefrom; and an auxiliary detachable lens-holding frame pivotally connected to each of said cells and normally occupying a position to one side thereof and out of line therewith and adapted to be swung up in front of the main lens-holder to be used in conjunction therewith.

11. In a trial-frame, the combination of a cell or lens-holder; an auxiliary frame carried by said cell and shiftable with relation thereto; and a series of pivoted lens-holders carried by said frame.

12. In combination with a cell or lens-holder, a bracket secured thereto; a bar slidably mounted within said bracket; and a series of lens-holders pivotally supported from said bar.

13. In combination with a suitable support; a cell or lens-holder; and a series of auxiliary lens-holders pivotally connected thereto, depending therefrom, and bodily shiftable in the direction of the axis of the lens-holder, whereby one or another of said auxiliary lens-holders may be brought into position with reference to the main lens-holder and swung up in front of said main lens-holder to be used in conjunction therewith.

14. In a trial-frame, the combination of a supporting member; a pair of lens-cells depending therefrom; an auxiliary frame connected to and depending from each of said cells; and a series of lens-holders pivotally carried by said frames.

15. In a trial-frame, the combination of a pair of lens holders or cells; means for shifting said cells to secure the desired pupilary adjustment; and a scale located to one side of said holders, standing in plain view of the operator, and acting in conjunction with the means for shifting the cells, whereby the position of the cells may be readily determined.

16. In a trial-frame, the combination of a pair of lens holders or cells; means for shifting said cells to secure the desired pupilary adjustment; and a scale located to one side of said cells and at approximately right angles thereto, said scale acting in conjunction with the means for shifting the cells, whereby the position of the cells may be readily determined without the necessity of looking into the face of the patient.

17. In a trial-frame, the combination of a pair of lens holders or cells; a shaft for operating the same; a dial carried by said shaft; and an indicator working in conjunction with said dial.

18. In a trial-frame, the combination of a cell or lens-holder having its movable member provided with a rack; a worm-shaft meshing with said rack; and a scale or indicator located to one side of the cell or holder and working in conjunction with said shaft, whereby the degree of rotation of the movable member may be determined without the necessity of looking directly at the holder.

19. In a cell or lens-holder, the combination of a fixed member; a rotatable member; means for rotating said rotatable member; and a scale or index standing at approximately right angles to the cell and working in conjunction with the means, whereby the position or degree of rotation of the movable member may be determined without viewing the holder directly.

20. In a cell or lens-holder, the combination of a fixed member; a rotatable member; a shaft for rotating said rotatable member extending out to one side of the holder; and a scale or index working in conjunction with said shaft, said scale standing at approximately right angles to said shaft, whereby the position or degree of rotation of the movable member may be determined without the necessity of the operator looking directly at the face of the patient.

21. In a lens holder or cell, the combination of a fixed member; a rotatable member for holding the lens; means for rotating said member; an index or dial working in conjunction with said means; a second movable member carried by or upon the outer edge or face of the fixed member; and a pointer carried by said second movable member.

22. In a lens holder or cell, the combination of a fixed member; a rotatable lens-holding member carried thereby and provided with a curved rack; a worm-shaft for operating said movable member; an index or dial working in conjunction with said shaft; a second movable member carried by the fixed member; a pointer carried by said second movable member; and means for locking the pointer in its adjusted position.

23. In a trial-frame, the combination of a suitable support; a pair of lens-holders carried thereby; means for securing the pupilary adjustment of said holders; an index working in conjunction with said means and standing to one side of the support; means for securing rotation of the movable members of the lens-holders; and an index working in conjunction with said means and standing to one side of the support, whereby the indices may be viewed without looking into the face of the patient.

24. In a trial-frame, the combination of a suitable frame or support; a pair of lens holders or cells depending therefrom; and a removable nose-piece comprising means for clamping it upon the support, and an independent, horizontally and vertically adjustable member carried by said clamping means adapted to rest upon the nose of the patient.

25. In a trial-frame, the combination of a support; a pair of lens holders or cells carried thereby; and a detachable nose-piece comprising spring-actuated arms 32, 33, adapted to grasp the support, a vertically-disposed post or column 38 adjustably secured to the clamping member, a horizontally-disposed bar or rod adjustably mounted in the lower end of said post, and a nose-piece 41 carried at the inner end of said bar.

26. In combination with a trial-frame, means for securing it to the head of the patient; cells or lens-holding devices carried thereby; and means for permitting the cells or lens-holding devices to be moved edgewise in a vertical plane independent of the other parts, at right angles to the axis of the cells.

27. In a trial-frame, the combination of a main supporting member 1, side members 2 hinged thereto; a pneumatic cushion connected to the inner faces of said members; a flexible band or strap; and means for adjustably connecting said band or strap to the side members.

28. In combination with hinged members 1, 2, 2; a pneumatic cushion connected to the inner face thereof; slotted tubular members 5 connected to the outer faces of side members 2; a pneumatic strap; and means carried at the ends of said strap for adjustably connecting it to the slotted members 5.

29. In a trial-frame, the combination of a main supporting member 1; means for yieldingly supporting it upon the head of the patient; a cross-tube 15 swiveled upon the supporting member; sleeves 19 carried by said tube; a shaft extending through the tube and carrying suitable pinions; racks 18 working in the sleeves and meshing with the pinions; a second tubular member 20 journaled in the lower ends of said racks 18; a pair of cells or lens-holders carried by said second tubular member; and a shaft working in conjunction with said cells for securing pupilary adjustment.

30. In a trial-frame, the combination of a suitable support; a pair of lens cells or holders carried by said support, said cells or holders being movable toward and from each other to secure pupilary adjustment, movable toward and from the support, and also bodily movable to one or the other side of their normal vertical position toward or from the face of the patient; and means for adjusting the cells in their various positions and maintaining them in such adjusted position.

31. In a trial-frame, the combination of a suitable support; a pair of lens-holders carried thereby; means for securing the pupilary adjustment of said holders; an index standing at approximately right angles to said holders and working in conjunction with said means; means for securing rotation of the movable members of the lens-holders; and an index standing at approximately right angles to the holder and working in conjunction with said means for securing rotation of the movable members.

32. An optical trial-frame comprising a head-rest, a hanger supported therefrom, and freely vibratable about its support on said head-rest, means for clamping said hanger in said support to secure it in any desired position, and a lens-holder carried by said hanger.

33. An optical trial-frame comprising a head-rest, a lens-holder and an extensible hanger by which said lens-holder is supported from its head-rest.

34. An optical trial-frame comprising a head-rest, a hanger thereon, a lens-holder having an arm pivotally mounted in said hanger, means for clamping said arm in any desired position, and a lens rotatably supported in said lens-holder.

In testimony whereof I have signed my name to this specification in the presence of two subscribing witnesses.

SIEGFRIED G. MARSHUTZ.

Witnesses:
S. WOLFSTEIN,
S. WENDT.

---

It is hereby certified that in Letters Patent No. 724,197, granted March 31, 1903, upon the application of Siegfried G. Marshutz, of Los Angeles, California, for an improvement in "Trial-Frames for Oculists or Opticians," errors appear in the printed specification requiring correction, as follows: Page 1, line 61, the word "mean" should read *means;* page 3, line 113, the parentheses before the word "indicated" and after the word "works" should be stricken out and commas inserted after the word "pointer" and after the numeral "62" in the same line; and that the said Letters Patent should be read with these corrections therein that the same may conform to the record of the case in the Patent Office.

Signed and sealed this 16th day of June, A. D., 1903.

[SEAL.]

F. I. ALLEN,
*Commissioner of Patents.* one side of the support, whereby the indices may be viewed without looking into the face of the patient.

24. In a trial-frame, the combination of a suitable frame or support; a pair of lens holders or cells depending therefrom; and a removable nose-piece comprising means for clamping it upon the support, and an independent, horizontally and vertically adjustable member carried by said clamping means adapted to rest upon the nose of the patient.

25. In a trial-frame, the combination of a support; a pair of lens holders or cells carried thereby; and a detachable nose-piece comprising spring-actuated arms 32, 33, adapted to grasp the support, a vertically-disposed post or column 38 adjustably secured to the clamping member, a horizontally-disposed bar or rod adjustably mounted in the lower end of said post, and a nose-piece 41 carried at the inner end of said bar.

26. In combination with a trial-frame, means for securing it to the head of the patient; cells or lens-holding devices carried thereby; and means for permitting the cells or lens-holding devices to be moved edgewise in a vertical plane independent of the other parts, at right angles to the axis of the cells.

27. In a trial-frame, the combination of a main supporting member 1, side members 2 hinged thereto; a pneumatic cushion connected to the inner faces of said members; a flexible band or strap; and means for adjustably connecting said band or strap to the side members.

28. In combination with hinged members 1, 2, 2; a pneumatic cushion connected to the inner face thereof; slotted tubular members 5 connected to the outer faces of side members 2; a pneumatic strap; and means carried at the ends of said strap for adjustably connecting it to the slotted members 5.

29. In a trial-frame, the combination of a main supporting member 1; means for yieldingly supporting it upon the head of the patient; a cross-tube 15 swiveled upon the supporting member; sleeves 19 carried by said tube; a shaft extending through the tube and carrying suitable pinions; racks 18 working in the sleeves and meshing with the pinions; a second tubular member 20 journaled in the lower ends of said racks 18; a pair of cells or lens-holders carried by said second tubular member; and a shaft working in conjunction with said cells for securing pupilary adjustment.

30. In a trial-frame, the combination of a suitable support; a pair of lens cells or holders carried by said support, said cells or holders being movable toward and from each other to secure pupilary adjustment, movable toward and from the support, and also bodily movable to one or the other side of their normal vertical position toward or from the face of the patient; and means for adjusting the cells in their various positions and maintaining them in such adjusted position.

31. In a trial-frame, the combination of a suitable support; a pair of lens-holders carried thereby; means for securing the pupilary adjustment of said holders; an index standing at approximately right angles to said holders and working in conjunction with said means; means for securing rotation of the movable members of the lens-holders; and an index standing at approximately right angles to the holder and working in conjunction with said means for securing rotation of the movable members.

32. An optical trial-frame comprising a head-rest, a hanger supported therefrom, and freely vibratable about its support on said head-rest, means for clamping said hanger in said support to secure it in any desired position, and a lens-holder carried by said hanger.

33. An optical trial-frame comprising a head-rest, a lens-holder and an extensible hanger by which said lens-holder is supported from its head-rest.

34. An optical trial-frame comprising a head-rest, a hanger thereon, a lens-holder having an arm pivotally mounted in said hanger, means for clamping said arm in any desired position, and a lens rotatably supported in said lens-holder.

In testimony whereof I have signed my name to this specification in the presence of two subscribing witnesses.

SIEGFRIED G. MARSHUTZ.

Witnesses:
S. WOLFSTEIN,
S. WENDT.

---

It is hereby certified that in Letters Patent No. 724,197, granted March 31, 1903, upon the application of Siegfried G. Marshutz, of Los Angeles, California, for an improvement in "Trial-Frames for Oculists or Opticians," errors appear in the printed specification requiring correction, as follows: Page 1, line 61, the word "mean" should read *means;* page 3, line 113, the parentheses before the word "indicated" and after the word "works" should be stricken out and commas inserted after the word "pointer" and after the numeral "62" in the same line; and that the said Letters Patent should be read with these corrections therein that the same may conform to the record of the case in the Patent Office.

Signed and sealed this 16th day of June, A. D., 1903.

[SEAL.]

F. I. ALLEN,
*Commissioner of Patents.*

It is hereby certified that in Letters Patent No. 724,197, granted March 31, 1903, upon the application of Siegfried G. Marshutz, of Los Angeles, California, for an improvement in "Trial-Frames for Oculists or Opticians," errors appear in the printed specification requiring correction, as follows: Page 1, line 61, the word "mean" should read *means;* page 3, line 113, the parentheses before the word "indicated" and after the word "works" should be stricken out and commas inserted after the word "pointer" and after the numeral "62" in the same line; and that the said Letters Patent should be read with these corrections therein that the same may conform to the record of the case in the Patent Office.

Signed and sealed this 16th day of June, A. D., 1903.

[SEAL.]

F. I. ALLEN,
*Commissioner of Patents.*